Nov. 18, 1969 W. L. SPAID 3,479,644
BINARY NUMBER COMPARATOR CIRCUIT
Filed Nov. 29, 1966
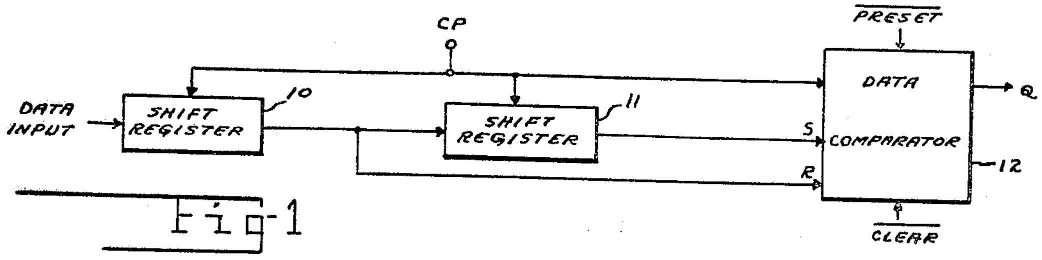
Fig-1
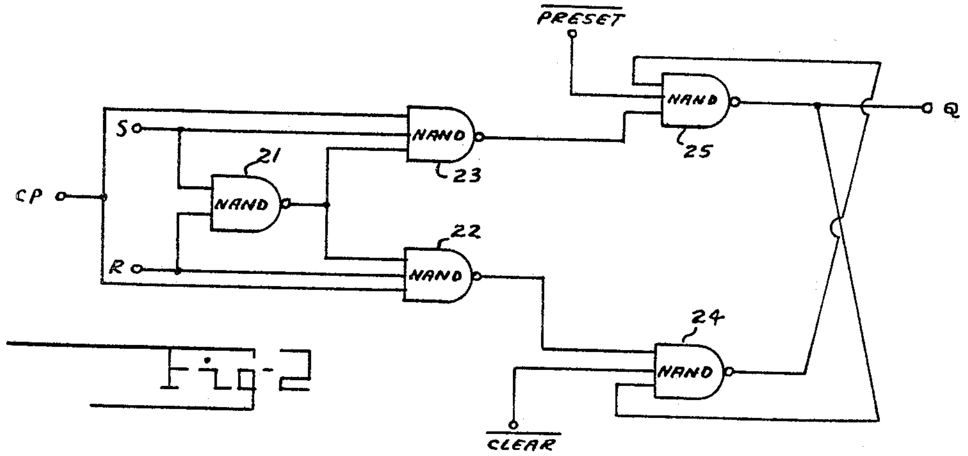
Fig-2
| S | R | $f_1$ | $f_2$ |
|---|---|---|---|
| 1 | 0 | 0 | 1 |
| 1 | 1 | 1 | 1 |
| 0 | 1 | 1 | 0 |
| 0 | 0 | 1 | 1 |
Fig-3
| S | R | Q |
|---|---|---|
| 1 | 0 | 1 |
| 1 | 1 | -- |
| 0 | 1 | 0 |
| 0 | 0 | -- |
Fig-4
INVENTOR.
WILLIAM L. SPAID
BY Harry A. Herbert Jr
ATTORNEY
John P. O'Brien
AGENT

United States Patent Office 3,479,644
Patented Nov. 18, 1969

3,479,644

BINARY NUMBER COMPARATOR CIRCUIT

William L. Spaid, Cedarville, Ohio, assignor to the United States of America as represented by the Secretary of the Air Force

Filed Nov. 29, 1966, Ser. No. 597,810
Int. Cl. G08c *9/00*
U.S. Cl. 340—146.2 2 Claims

ABSTRACT OF THE DISCLOSURE

The comparator circuit of this invention determines the relative magnitude of two binary numbers. Two binary numbers are fed into the comparator circuit one bit at a time, starting with the least significant bit of each binary number. The instantaneous output of the comparator circuit indicates by its state (either "zero" or "one") which bit of each set of bits is the larger. When the comparison between the most significant bits is completed, the output state of the comparator circuit indicates which binary number is larger.

The invention described herein may be manufactured and used by or for the United States Government for governmental purposes without the payment to me of any royalty thereon.

Background of the invention

The ability to compare two binary numbers is very important to any binary computer. This comparison may be accomplished in parallel (all bits at one time) by a rather large combinational circuit or it may be performed serially (one bit from each number at a time) by using a sequential circuit. This invention uses the sequential-circuit type comparator.

Summary of the invention

Basically, the operation of the binary comparator of this invention is as follows. Two binary numbers are sent to the comparator one bit at a time starting with the least-significant bit of each binary number. When the comparison between the most-significant bits is completed, the comparator output indicates by its state which binary number is larger. A clock signal is used to tell when the data is present at the inputs to the comparator and this data will not change while the clock signal is present. The possibility of equal binary numbers may be handled in various ways as will be explained hereinafter.

Brief description of the drawings

FIG. 1 is a simplified block diagram of the overall binary number comparator system constructed in accordance with the present invention;

FIG. 2 is a detailed block diagram of a binary number comparator circuit constructed in accordance with the present invention;

FIG. 3 is a table setting forth the output pulses of NAND stages 22 and 23 for the various combinations of inputs into the comparator circuit; and FIG. 4 is the truth table for the comparator circuit of this invention.

Description of the preferred embodiment

Referring to FIG. 1, there is shown in block diagram form two conventional shift registers 10 and 11 being used to feed, respectively, binary numbers R and S into data comparator 12. Binary numbers R and S are delivered to data comparator 12 one bit at a time, the least significant bit first.

Data comparator 12 operates on each set of bits to determine which of the two bits is larger. After the comparison of the most significant bit of R and S has been completed, the state (either "zero" or "one") of output Q will indicate which binary number R or S is larger.

A periodic clock pulse CP causes shift registers 10 and 11 to simultaneously feed the next least significant bit of a binary number into comparator 12. Also each clock pulse CP initiates the comparing operation in comparator 12 between each set of bits.

Diagrammatically illustrated in FIG. 2 is a comparing system which incorporates the teachings of the invention and includes a plurality of stages shown in block form. Each block 21 through 25 represents a conventional NAND circuit.

NAND stages 24 and 25 and their associated circuitry form a flip-flop circuit. The flip-flop arrangement results from the output of stages 24 and 25 being fed back to the input of the opposite stage. Such an arrangement establishes bistable operation (when one stage conducts, the other stage is cut off and vice versa).

To illustrate this bistable operation consider the following. Assume the initial output stage of the flip-flop circuit at Q is in the "zero" state. The output Q will remain in the "zero" stage until either a "zero" pulse is applied to NAND stage 25 or a "one" pulse is applied to NAND stage 24. Upon the application of a "zero" pulse input to NAND stage 25 or a "one" pulse input to NAND stage 24, the output Q will instantaneously switch from the "zero" state to the "one" state. Output Q will thereafter remain in the "one" state until either a "one" pulse is applied to stage 25 or a "zero" pulse is applied to stage 24.

The novel operation of NAND stages 21, 22 and 23 will now be explained. Binary numbers S and R are delivered to NAND stage 21 one bit at a time, the least significant bit of S and R being first. Simultaneously input S is applied to NAND stage 23 and input R is applied to NAND stage 22. The output pulse of NAND stage 21 is also applied to NAND stages 22 and 23. Clock pulse CP is applied to NAND stages 22 and 23 and initiates the operation of NAND stages 22 and 23. The various combinations of inputs S and R and the corresponding outputs of stages 22 and 23 are shown in the table of FIG. 3, where $f_1$ and $f_2$ represent the outputs of stages 23 and 22, respectively.

From the table of FIG. 3, it can be seen that the outputs of $f_1$ and $f_2$ are "ones" whenever both S and R equal. The significance of this result is that a "one" is applied to the flip-flop circuit via stages 24 and 25, for the condition $S=R$, and the output state of Q does not change with a "one" pulse applied to both NAND stages 24 and 25.

The table of FIG. 4 represents the truth table of comparator circuit 12. It can be derived from the table of FIG. 3. Taking the first condition of FIG. 3, where $S=1$ and $R=0$, it is seen $f_1=0$ and $f_2=1$. As explained above, $f_1$ is the input to stage 25 and with the condition of $f_1=0$, the output of NAND stage 25 is a "one" because a "zero" input to a conventional NAND circuit always produces a "one" output. Under this same condition ($S=1$, $R=0$), the output of stage 24 is a "zero" for all the inputs to stage 24 are "ones," i.e. $f_2=1$, feedback voltage from stage 25 is "one" and $\overline{\text{CLEAR}}$ voltage is always "one" (as will be explained hereinafter).

For the condition $S=0$ and $R=1$, each of the above stated outputs are of course, just the opposite, resulting in a "zero" at the Q output.

As already explained when S equals R (either $S=R=0$ or $S=R=1$), the outputs $f_1$ and $f_2$ are "ones" and the output state of comparator 12 does not change, i.e. the output Q remains a "one" if the previous comparison yielded a "one" and vice versa.

In order to handle the condition of equal numbers, the output state Q of comparator circuit 12 is predetermined before my comparisons are made. Predetermination is accomplished by making either the $\overline{PRESET}$ or $\overline{CLEAR}$ input a "one" and the other input a "zero" without the presence of a clock pulse CP and determining the resulting output at Q. By having a "zero" clock pulse the outputs of NAND circuits 22 and 23 are always "ones" regardless of inputs R and S, and have no effect on the Q output state.

To illustrate predetermination assume the $\overline{PRESET}$ input is made a "one" and $\overline{CLEAR}$ is made a "zero," then Q would be a "zero" since all the inputs into NAND circuit 25 are "ones." To prepare for the first comparison $\overline{PRESET}$ and $\overline{CLEAR}$ inputs are then set as "ones" and remain "ones" through each comparison. Due to the flip-flop arrangement, Q stays set to its predetermined state regardless of the subsequent setting of $\overline{PRESET}$ and $\overline{CLEAR}$. If the first comparison is between equal bits, Q retains its predetermined state, which in the above illustration would be a "zero."

One of the intended uses of this invention is in conjunction with subtracting a series of binary numbers. The output state of the comparator circuit would be used to control switching circuits in such a manner that the larger of the two binary numbers would go to the minuend input of a subtractor circuit and the smaller number to the subtrahend input. This use enables the subtracting circuit to always have a positive number for its answer. The above-stated use is not given in detail for it is not considered part of this invention but is given for exemplary purposes only. There are many other uses for which this invention could be adapted.

To illustrate the operation of the comparator circuit of this invention, two binary numbers will be compared. For example, let $S=1010$ and $R=1001$. The first comparison is between the least significant bits of S and R, which is $S=0$ and $R=1$. For this condition, it is seen from the truth table of FIG. 4 that Q=0. The next comparison is for the condition $S=1$ and $R=0$, with the result that $Q=1$. The third clock pulse would initiate the comparison between $S=0$ and $R=0$. Since they are equal, the output Q remains in the same state as its previous comparison or $Q=1$. The final comparison is between the most significant bits where $S=1$ and $R=1$. Again they are equal and Q output is still a "one." A final readout of "one" indicates that S is greater than R, which, of course, it is.

For a second example, let $S=1010$ and $R=1111$, i.e. $R>S$. The first comparison between $S=0$ and $R=1$ produces $Q=0$. The second comparison between $S=1$ and $R=1$ causes no change in Q, i.e. $Q=0$. The next set ($S=0$, $R=1$) yields $Q=0$. The final set ($S=1$, $R=1$) again causes Q to retain its previous state, thus $Q=0$. Hence, the final state of $Q=0$ indicates $R>S$, which is true.

I claim:

1. A comparator apparatus for determining the relative magnitude of two binary numbers comprising:
- (a) first, second and third NAND stages;
- (b) means for applying to said first and second NAND stages one of said two binary numbers, one bit at a time with the least significant bit first;
- (c) means for applying to said first and third NAND stages the other of said two binary numbers, one bit at a time with the least significant bit first;
- (d) means for connecting the output of said first NAND stage to the inputs of said second and third NAND stages;
- (e) means for applying a clock pulse to said second and third NAND stages;
- (f) a flip-flop circuit with one output terminal;
- (g) means for applying the outputs of said second and third NAND stages to said flip-flop circuit, whereby the final output state of said flip-flop circuit indicates which of said two binary numbers is larger.

2. A comparator device as described in claim 1 wherein said flip-flop circuit includes:
- (a) fourth and fifth NAND stages;
- (b) means for applying the output of said second NAND stage to the input of said fourth NAND stage;
- (c) means for applying the output of said third NAND stage to the input of said fifth NAND stage;
- (d) means for applying a $\overline{PRESET}$ voltage to said fourth NAND stage;
- (e) means for applying a $\overline{CLEAR}$ voltage to said fifth NAND stage;
- (f) means for connecting the output of said fourth NAND stage to the input of said fifth NAND stage;
- (g) means for connecting the output of said fifth NAND stage to the input of said fourth NAND stage; and
- (h) means for connecting said output terminal to the output of said fourth NAND stage.

References Cited

UNITED STATES PATENTS

| | | | |
|---|---|---|---|
| 3,067,934 | 12/1962 | Amacher et al. ---- | 340—146.2 X |
| 3,313,927 | 4/1967 | Raike et al. -------- | 340—146.2 |

MALCOLM A. MORRISON, Primary Examiner

R. STEPHEN DILDINE, Jr., Assistant Examiner

U.S. Cl. X.R.

307—215